United States Patent [19]

Meistrell

[11] Patent Number: 4,955,710

[45] Date of Patent: Sep. 11, 1990

[54] ADJUSTABLE HEADBAND ASSEMBLY ATTACHED TO SPECTACLES FRAME STEMS

[75] Inventor: William R. Meistrell, Manhattan Beach, Calif.

[73] Assignee: Dive N'Surf, Inc., Hermosa Beach, Calif.

[21] Appl. No.: 408,667

[22] Filed: Sep. 18, 1989

[51] Int. Cl.$^5$ .................................................. G02C 3/00
[52] U.S. Cl. ..................................... 351/156; 351/157
[58] Field of Search ................................. 351/156, 157

[56] References Cited

U.S. PATENT DOCUMENTS

| | | | |
|---|---|---|---|
| 1,819,738 | 8/1931 | Daniels | 351/156 |
| 2,481,946 | 9/1949 | Pendleton | 351/157 |
| 2,539,922 | 1/1951 | Nyberg | 351/157 |
| 2,704,961 | 3/1955 | Weil | 351/157 |
| 3,450,467 | 6/1969 | Phillips | 351/156 |
| 3,502,396 | 3/1970 | Greenberg | 351/156 |
| 3,874,776 | 4/1975 | Seron | 351/156 |
| 3,879,804 | 4/1975 | Lawrence | 351/157 |
| 4,133,604 | 1/1979 | Fuller | 351/156 |
| 4,692,002 | 9/1987 | Meistrell | 351/156 |

OTHER PUBLICATIONS

Madison Dental Co., "SAFE T GARD", 1970.

Primary Examiner—Paul M. Dzierzynski
Attorney, Agent, or Firm—William W. Haefliger

[57] ABSTRACT

An adjustable retainer for a spectacles frame, which comprises an elongated band assembly including multiple bands, the assembly being generally U-shaped; at least two of the bands having adjustable, lengthwise, relatively slidable interfit; whereby the overall length of the U-shaped assembly may be quickly adjusted to fit the wearer's head.

15 Claims, 2 Drawing Sheets

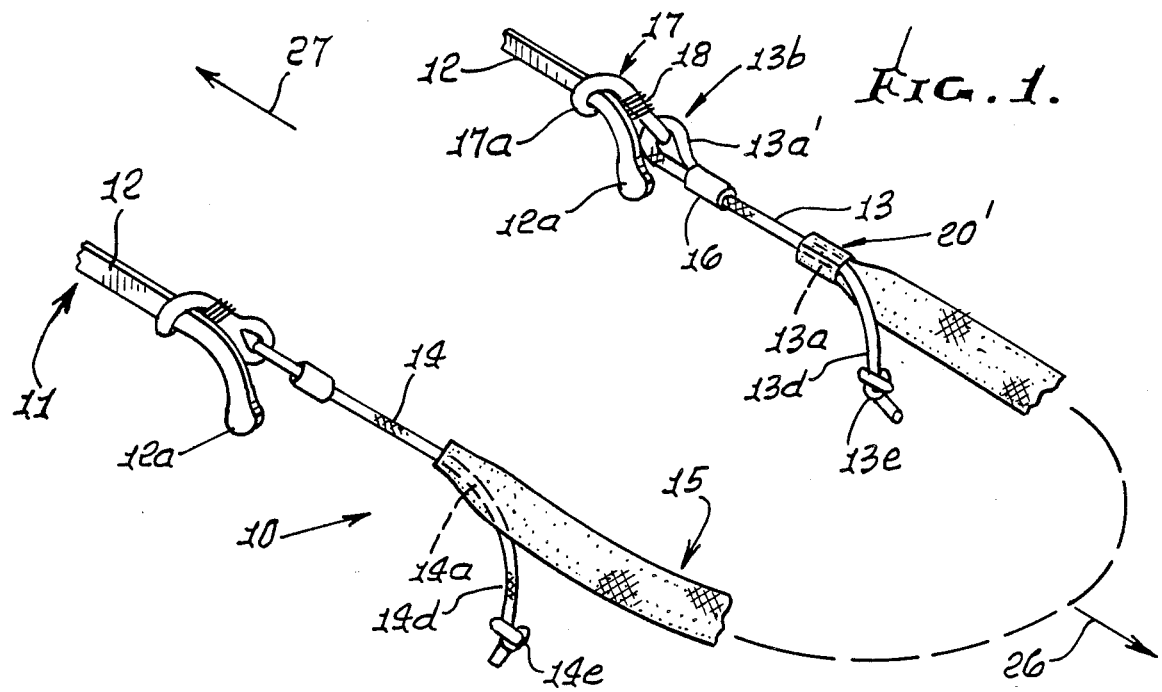
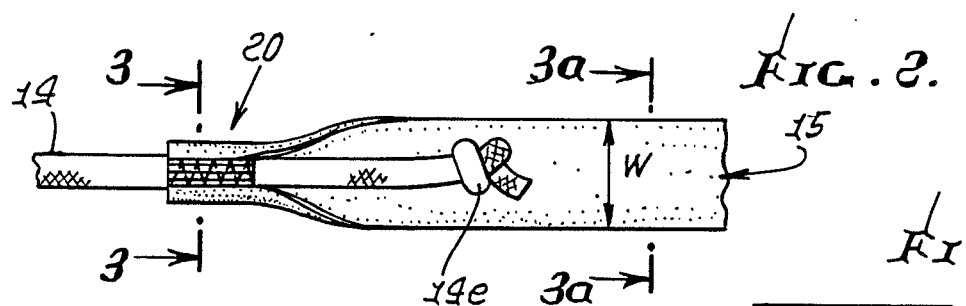
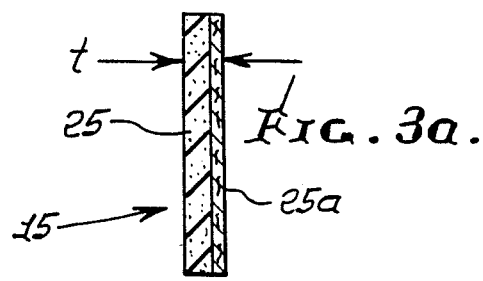
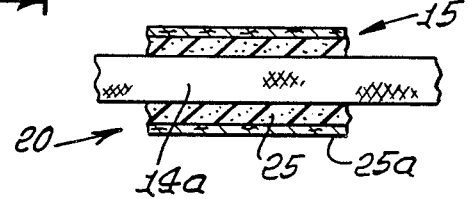
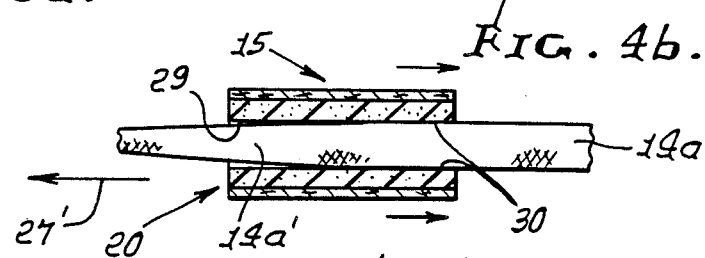
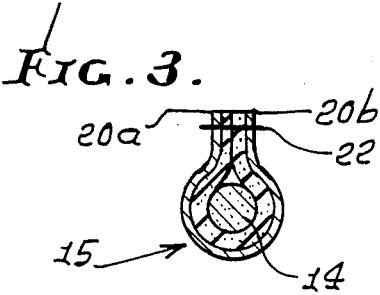
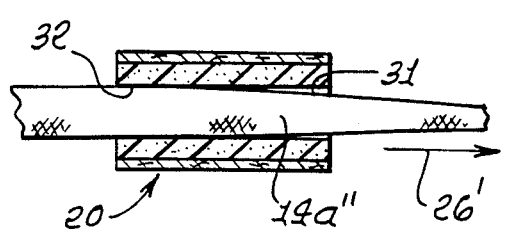

ADJUSTABLE HEADBAND ASSEMBLY ATTACHED TO SPECTACLES FRAME STEMS

BACKGROUND OF THE INVENTION

This invention relates generally to retention of spectacles frames to wearer's heads, and more particularly, to a retainer having multiple bands which are quickly and easily adjustable to enable use of the retainer in different modes, as well as its adjustment to the wearer's head.

In the past, various retention devices have been employed, as for example are exemplified by the following U.S. Pat. Nos.:
4,133,604
2,704,961
2,481,946
3,450,467
1,819,738
3,829,804
3,874,776
3,502,396
4,692,002

None of such devices incorporates the unusually advantageous adjustable structures, modes of operation and unique results as are now afforded by the present invention.

SUMMARY OF THE INVENTION

It is a major object of the present invention to provide an improved retainer meeting the need for an adjustable device incorporating the above-described features. Basically, the improved retainer comprises:

(a) an elongated band assembly including multiple bands, the assembly being generally U-shaped, (b) at least two of the bands having adjustable, lengthwise, relatively slidable interfit, (c) whereby the overall length of the U-shaped assembly may be quickly adjusted to fit the wearer's head.

It is a further object to provide such a device wherein one of the two bands has elongated cord configuration, and the other of the two bands is locally wrapped about a local portion of the one band to provide a relatively slidable, frictional interfit therebetween. Typically, one band is attached at one end thereof to a spectacles frame, and the other band is adapted to wrap about the rear of the wearer's head.

It is yet another object of the invention to provide an improved retainer that includes first, second and third bands, the first and second bands having adjustable, lengthwise, relatively slidable interfit, and the third and second bands also having adjustable, lengthwise, relatively slidable interfit. As will appear, the first and third bands typically have elongated cord configuration, and wherein the second band is locally wrapped at least partly about a local portion of the first band to provide a relatively slidable frictional interfit therebetween;

locally wrapped at least partly about a local portion of the third band to provide a relatively slidable frictional interfit therebetween.

An important object is to provide an improved band assembly, as referred to, wherein each of the first and third bands has a free end portion that dangles relative to the second band and can be pulled to adjust one or both of the interfits.

These and other objects and advantages of the invention, as well as the details of an illustrative embodiment, will be more fully understood from the following specification and drawings, in which:

DRAWING DESCRIPTION

FIG. 1 is a perspective view showing a device incorporating the invention attached to spectacles;

FIG. 2 is an enlarged fragmentary view taken in elevation showing interfit of relatively slidable members;

FIG. 3 is a section taken on lines 3—3 of FIG. 2;

FIG. 3a is taken on lines 3a—3a of FIG. 2;

Figure 5:
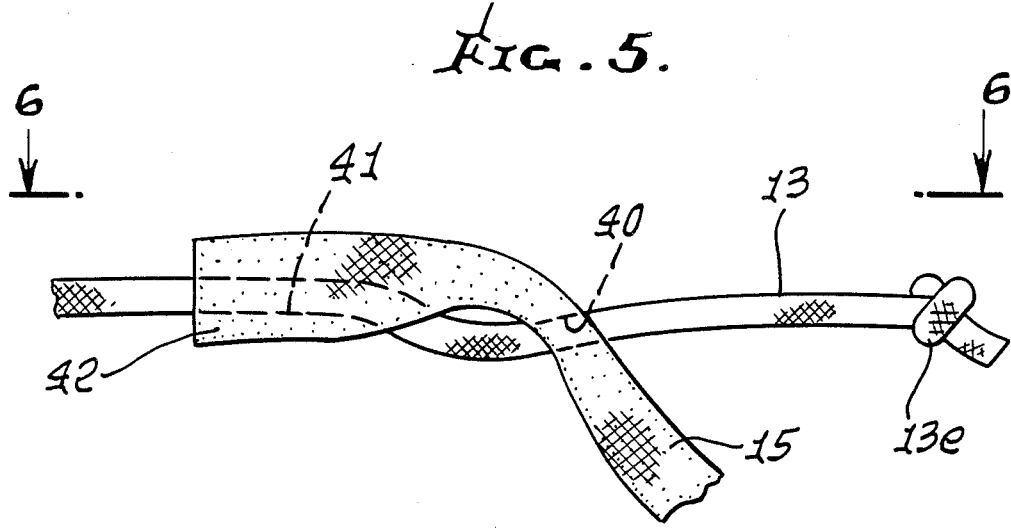

FIGS. 4(a) and 4(b) are two similar sectional views showing interfit of the relatively slidable members, before and after tension application to one member;

FIG. 4(c) shows opposite tension applied to the device;

FIG. 5 is a side elevation showing modification; and

Figure 6:
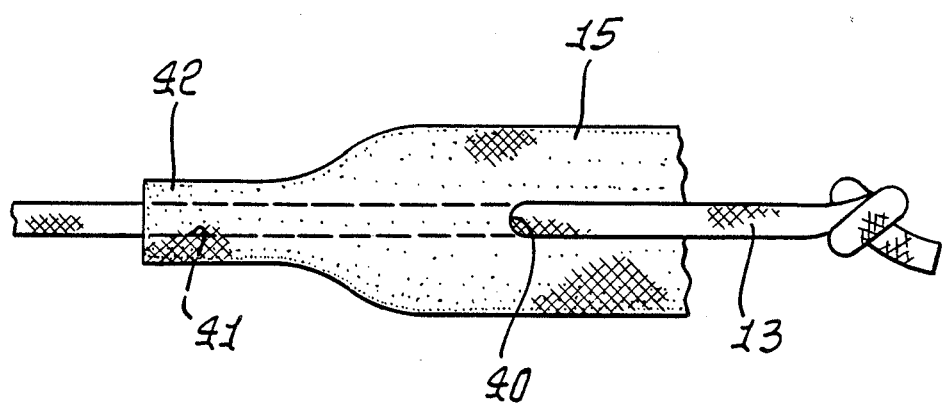

FIG. 6 is a plan view on lines 6—6 of FIG. 5.

DETAILED DESCRIPTION

In the drawings, the adjustable retainer 10 is adapted for use with a spectacles frame 11 of which the two frame stems are shown at 12. The stems are shown as curving downwardly at 12a for ear retention.

The retainer 10 includes an elongated, multiple band assembly that typically comprises at least two bands, and preferably three, the overall assembly in use being generally U-shaped, lengthwise. The three bands are shown at 13, 14, and 15. In accordance with the invention, at least two of the bands (bands 13 and 15, or bands 14 and 15, or both of them) have adjustable, lengthwise, relatively slidable interfit, whereby the overall length of the U-shaped assembly may be quickly adjusted to fit the wearer's head; for example, the adjustment band 15, which extends about the rear of the wearer's head, may be quickly and efficiently tightened or loosened, and the relative positions of the bands, as adjusted, will be retained.

As shown, bands 13 and 14 have elongated cord configuration, and they may have lengthwise resilient stretchability, i.e., may yield resiliently, when pulled, such stretching locally reducing cord diameter. They may consist of elastomeric or other resiliently yieldable material. Each of these cords or bands may be attached to a frame stem as shown for example in FIG. 1, other modes of attachment being usable. Merely as illustrated, band 13 is doubled back upon itself at 13a', and a clip 16 attached, thereby to form band loop 13b. To that loop is attached a plastic strand loop 17 which is received over the stem 12 at 17a, near turned end portion 12a. A wire coil 18 fitted about the loop 17 is then adjusted on the loop 17 to clamp it to the stem. Band 14 is similarly attached to the other stem.

Extending the description to FIGS. 2-4, the other band 15 (to which each of bands 13 and 14 is attached) is in the form of a thin, flexible strip of material having width "w" and thickness "t", where w>>t, typically. It therefore can be locally wrapped at 20 about a local portion (14a for example) of band 14, and at 20' about a local portion (13a for example) of band 13. These wrappings frictionally engage the surface of the cord or band portions 13a and 14a to provide relatively slidable, frictional interfits therebetween. The edge portions 20a and 20b of the wrap 20 are typically sewn together at 22 (see FIG. 3) to provide the frictional interfit.

Band 15 is typically lengthwise and stretchable, and also widthwise stretchable; and it is also compressible in its thickness dimension. It may consist, advantageously, of a strip 25 of closed cell elastomeric compressible foam, lined on one side with a sheet 26 of compressible synthetic polymer fabric. Examples are foamed NEOPRENE (at 25) and stretchable NYLON (at 26). The foam has a thickness between 1/32 inch and 1/16 inch. The band wrap 20 covers the compressible foam 25 to lightly grip the cord 14 (and also cord 13). Other band 15 materials are usable so long as the cords 13 and 14 are lightly gripped to provide the adjustment functions referred to.

It will be noted that in the assembly, as seen in FIG. 1, the cords 13 and 14 have free end portions 13d and 14d that dangle relative to band 15, the latter shown in the position it would have when attached about the wearer's head. In accordance with the invention, the ends of the dangling end portions 13d and 14d can be pulled, to effect sliding endwise slippage of the portions 13a and 14a relative to loops 20, as desired, to adjust such interfits, as for example tighten the band 15 about the back of the head. Conversely, band 15 can be pulled rearwardly (see arrow 26 in FIG. 1) to effect reverse slippage at the local interfit, thereby to loosen its attachment to the head; and the same loosening can be achieved by pulling the spectacles frame forwardly (see arrow 27 in FIG. 1).

The length of the bands 13-15 is such that they can be relatively elongated until knots 13e and 14e (at the ends of the dangling extents 13d and 14d) come into engagement with the loops 20 and 20'. This then allows lowering of the band 1 to the back of the wearer's neck, and safe lowering of the spectacles to hang downwardly at and on the chest of the wearer.

Referring now to FIG. 4(a), it shows the local frictional interfit of cord or band 14a with the looping portion 20 of band 15. As seen in FIG. 4(b), when band 14a is pulled forwardly (see arrow 27') as by pulling the spectacles forwardly, the cord elongates and locally reduces in diameter at 14a', locally loosening its grip with the loop 20 at 29, whereby the slippage can occur, there still being frictional interfit at 30 to resist such slippage. Likewise, in FIG. 4(c), when band 14a is pulled rearwardly (see arrow 26'), as by pulling rearwardly on the dangling extent 14c of the band to tighten the assembly, the cord 14 elongates and locally reduces in diameter at 14a'', loosening its grip with the loop 20 at 31, whereby slippage can occur, there still being some frictional interfit at 32 to resist such slippage.

The part that is the compressible foam that engages the cords and bands 13 and 14 is important as respects enhancement of the frictional interfit gripping, and local loosening, as referred to; however, the band 15 can be made of other material as long as the interfit functions as referred to are enabled.

Referring to FIGS. 5 and 6, the elements that are the same as those in FIGS. 1–4 have the same identifying numerals. Additionally, the one band, as at 13 for example, also passes through an opening 40 in the other band 15. Opening 40 has an annular inner edge 40a which frictionally hugs the one, cord-like band 13 to resist slippage of band 13 through the opening. Opening 40 is in general alignment with the passage 41 defined by the local wrapping at 42 of band 15 about band 13.

This construction produces a second frictional resistance to slippage of the two bands 13 and 15. The same construction may be effected as between bands 14 and 15.

I claim:

1. An adjustable retainer for a spectacles frame, comprising, in combination:
   (a) an elongated band assembly including multiple bands, the assembly being generally U-shaped,
   (b) at least two of the bands having adjustable, lengthwise, relatively slidable interfit,
   (c) whereby the overall length of the U shaped assembly may be quickly adjusted to fit the wearer's head,
   (d) said assembly including first, second and third bands, end portions of the first and second bands having said adjustable, lengthwise, relatively slidable interfit, and other band end portions also having adjustable, lengthwise, relatively slidable interfit,
   (e) the first band having a free end portion that dangles and can be pulled to adjust the interfit of the first and second bands.

2. The combination of claim 1 wherein one of said first and second bands has elongated cord configuration, and the other of said first and second bands is locally wrapped about a local portion of said one band to provide a relatively slidable, frictional interfit therebetween.

3. The combination of claim 2 wherein said one band is attached at one end thereof to a spectacles frame, and the other band is adapted to wrap about the rear of the wearer's band.

4. The combination of claim 2 wherein said one band having elongated cord configuration also passes through an opening in the other of said two bands.

5. An adjustable retainer for a spectacles frame, comprising, in combination
   (a) an elongated band assembly including multiple bands, the assembly being generally U-shaped,
   (b) at least two of the bands having adjustable, lengthwise, relatively slidable interfit,
   (c) whereby the overall length of the U-shaped assembly may be quickly adjusted to fit the wearer's head,
   (d) said assembly including first, second and third bands, the first and second bands having said adjustable, lengthwise, relatively slidable interfit, and the third and second bands also having adjustable, lengthwise relatively slidable interfit.

6. The combination of claim 5 wherein said first and third bands have elongated cord configuration.

7. The combination of claim 6 wherein the second band is
   locally wrapped at least partly about a local portion of the first band to provide a relatively slidable frictional interfit therebetween, and
   locally wrapped at least partly about a local portion of the third band to provide a relatively slidable frictional interfit therebetween.

8. The combination of claim 7 wherein each of said first and third bands is attached at one end thereof to a spectacles frame, and the second band is adapted to wrap about the head of the wearer, and to adjust to the wearer's head by adjustment of said interfits.

9. The combination of claim 8 including connector loops of material connecting said first and third bands to stems defined by said frame.

10. The combination of claim 9 wherein said first and third bands have looping end portions engaging said connector loops.

11. The combination of claim 8 wherein each of said first and third bands has a free end portion that dangles relative to the second band and can be pulled to adjust one or both of said interfits.

12. The combination of claim 11 including enlarged stops at or proximate ends of said dangling free end portions.

13. The combination of claim 12 wherein said opening in said other band has an edge which frictionally hugs said one band to frictionally resist slippage of said one band through said opening.

14. The combination of claim 12 wherein said opening is in general alignment with a passage defined by the other band wrapped about said local portion of the one band.

15. The combination of claim 5 wherein the second band consists of a first layer of foamed elastomeric material, and a second backer layer of stretchable synthetic polymeric material, the foamed elastomeric material engaging the first and third bands at said interfits.

* * * * *